United States Patent [19]
Lescoche

[11] Patent Number: 5,593,581
[45] Date of Patent: Jan. 14, 1997

[54] INORGANIC FILTRATION UNIT

[75] Inventor: Philippe Lescoche, Nyons, France

[73] Assignee: Societe Anonyme: T.A.M.I. Industries, Nyons, France

[21] Appl. No.: 512,130

[22] Filed: Aug. 7, 1995

Related U.S. Application Data

[63] Continuation of Ser. No. 170,320, filed as PCT/FR92/00587 Jun. 25, 1992 published as WO93/00154 Jan. 7, 1993, abandoned.

[30] Foreign Application Priority Data

Jun. 25, 1991 [FR] France ................................. 91 08136

[51] Int. Cl.$^6$ .................................................. B01D 63/08
[52] U.S. Cl. ............... 210/321.84; 210/489; 210/500.25; 210/510.1
[58] Field of Search .................. 210/323.1, 488, 210/489, 500.1, 509, 510.1, 900, 321.75, 321.84, 500.25

[56] References Cited

U.S. PATENT DOCUMENTS

| | | |
|---|---|---|
| 3,993,566 | 11/1976 | Goldberg . |
| 4,155,853 | 5/1979 | Shippey . |
| 4,222,874 | 9/1980 | Connelly ............................. 210/323.2 |
| 4,233,351 | 11/1980 | Okumura et al. . |
| 4,412,921 | 11/1983 | Leung et al. ......................... 210/500.2 |
| 4,971,696 | 11/1990 | Abe et al. .......................... 210/500.25 |
| 5,017,287 | 5/1991 | Kuntz et al. ....................... 210/497.01 |
| 5,114,581 | 5/1992 | Goldsmith et al. .................. 210/510.1 |
| 5,250,184 | 10/1993 | Maier .................................. 210/510.1 |

FOREIGN PATENT DOCUMENTS

| | | |
|---|---|---|
| 320033 | 6/1989 | European Pat. Off. . |
| 1563313 | 4/1969 | France . |
| 2050700 | 4/1971 | France . |
| 2061934 | 6/1971 | France . |
| 1792649 | 11/1971 | Germany . |
| 395871 | 7/1933 | United Kingdom . |
| 1557899 | 12/1979 | United Kingdom . |

*Primary Examiner*—W. L. Walker
*Attorney, Agent, or Firm*—Bacon & Thomas

[57] ABSTRACT

An inorganic filtration unit includes a filter element made up of an inorganic rigid porous support having a face covered with at least one separating layer, and an element for circulating a liquid medium containing particles to be separated therefrom which forms, together with the face of the filter element, a sheet of the liquid, the sheet having a height of between 0.1 and 3 mm and preferably between 0.2 and 1.5 mm.

20 Claims, 3 Drawing Sheets

INORGANIC FILTRATION UNIT

This application is a continuation of application Ser. No. 08/170,320, filed as PCT/FR92/00587 Jun. 25, 1992 published as WO93/00154 Jan. 7, 1993, now abandoned.

TECHNICAL FIELD

The present invention relates to the technical field of molecular or particle separation using separating elements, which are normally called membranes and are made of inorganic materials.

The object of the invention is more precisely to produce an inorganic filtration unit which makes it possible to concentrate, sort or extract molecular or particulate species contained in a liquid medium which is exerting a given pressure on the membrane.

The subject of the invention has a particularly advantageous application in the field of nanofiltration, ultrafiltration, microfiltration, filtration or reverse osmosis.

PRIOR ART

The inorganic membranes currently on the market are mainly in the form of a tube.

An inorganic membrane consists of a porous support produced in the form of a tube whose internal surface is provided with at least one separating layer, the nature and morphology of which are adapted to ensure the separation of the molecules or particles contained in the liquid medium circulating inside the tube. Inorganic membranes have the particular characteristic of possessing high mechanical strength values and of exhibiting thermal and chemical stability. Thus the stability and performance characteristics of inorganic membranes are far superior to those of the other category of membranes, namely organic membranes.

However, although the life of an inorganic membrane is longer than that of an organic membrane, the cost price of an inorganic membrane is very much greater than that of an organic membrane. In fact, inorganic membranes are manufactured by a batch process necessitating the production of a porous support, which involves the use of special tools to give them their particular cylindrical shape. Furthermore, since the pressure tends to burst the tubular support during the filtration operation, it is necessary to produce the porous support with a thick wall and to carry out a high degree of sintering so as to maintain the integrity of such a membrane.

Through the patent FR-2 061 934, the prior art has proposed a filtration unit of inorganic type comprising an element for the circulation of the liquid medium through a first network of mutually parallel channels of circular section, arranged on this element, and a filter element. The surface of the channels is covered with a separating layer for filtering a liquid medium circulating inside the channels. The porous unit is arranged so as to have a filter element comprising a second network of channels of circular section for recovering the filtrate which has passed through the porous support from the separating layer.

A first disadvantage of the filtration unit described by said patent relates to the fact that it is incapable of having a large exchange area, small hydraulic diameters and a simple construction. It is pointed out that a small hydraulic diameter makes it possible to obtain high velocity gradients and consequently high frictional forces, providing excellent cleaning of the membrane. Thus, to produce a high-performance unit, it would therefore be necessary on the one hand for the channels in which the fluid to be treated circulates to have a small diameter, for example of between 1 and 6 mm, in order to obtain adequate cleaning, and on the other hand for the number and diameter of the filtrate recovery channels to be respectively of the same order of magnitude as those of the channels in which the fluid to be treated circulates, so that the path of the filtrate inside the unit is as short and as uniform as possible. Now, the large number of channels in which the fluid to be treated circulates necessitates an equally high number of walls for separating the channels from one another. These separating walls, which constitute lost exchange areas, must have a sufficient thickness below which it appears to be difficult to achieve leaktightness in a simple manner. Consequently the decrease in the hydraulic diameter of the filter channels results in a loss of exchange area in such a filtration unit and in a construction of considerable complexity.

Another disadvantage of the filtration unit described by said patent relates to its relatively high hydraulic resistance. In general, the pressure loss of the filtering surfaces depends on the mean length of the path along which the filtrate passes inside the porous unit. Now, it appears that such a path is relatively long, on the one hand because of its inclination relative to the normal, so as to avoid the connecting walls between two recovery channels, and on the other hand because of the circular profile of the channels, which necessarily means that the length of the path of the permeate inside the unit varies at each point on the exchange surface. The pressure loss, and hence the hydraulic resistance offered by such a unit, do not make it possible to obtain a filter element with a high-performance filtration rate.

DESCRIPTION OF THE INVENTION

The aim of the present invention is to overcome the above-mentioned disadvantages by proposing an inorganic filtration unit having a large filtering area per unit volume of the membrane and a low hydraulic resistance of the filtering area, so as to provide a filtration unit possessing a high filtration rate.

The inorganic filtration unit according to the invention comprises:
at least one inorganic filter element composed of:
an inorganic rigid porous support having a face covered with at least one separating layer intended to be in contact with the liquid medium, which exerts a given pressure on said separating layer,
a counterthrust element exerting, on the support, an opposing pressure approximately equivalent to that applied to the separating layer,
and at least one cavity made in the porous support at a distance from the separating layer, the purpose of said cavity being to recover the filtrate which has passed through the porous support from the separating layer,
and at least one element for the circulation of the liquid medium.

According to the invention, in the filtration unit:
the porous support has a plane face covered with the separating layer or layers bonded to one another and to the porous support by sintering,
and the element for the circulation of the liquid medium determines, with the plane face of the filter element, a sheet of liquid with a height of between 0.1 and 3 mm and preferably of between 0.2 and 1.5 mm.

According to one advantageous characteristic, the channels communicate with one another to form a criss-cross filtrate recovery network.

Preferably, the counterthrust element applies the opposing pressure via bearings delimiting the cavity between the support and the counterthrust element.

In one particularly advantageous embodiment of the invention, the membrane comprises a counterthrust element which constitutes a complementary porous support having a principal external face provided with at least one separating layer intended to be in contact with the liquid medium to be filtered, which exerts the opposing pressure on said separating layer, making it possible to recover the filtrate which has passed through the two supports from the corresponding separating layers. Such a membrane works under compression insofar as the pressure of the liquid medium is exerted on the two separating layers placed on either side of the porous support. This embodiment makes it possible to produce a porous support with a low thickness. Advantageously, the complementary porous support is identical to the porous support and is symmetrically attached to the porous support.

In another advantageous embodiment, the complementary porous support can form an integral part of the porous support, so the membrane takes the form of an integrated element comprising two opposite plane faces, each capable of receiving a separating layer.

The porous supports constituting the membrane according to the invention have a plane general shape, so they can be joined together via assembly means to form a filtration unit with dimensions adapted to the filtration conditions to be observed.

Various other characteristics will become apparent from the following description referring to the attached drawings, which show, by way of non-limiting Examples, embodiments of the subject of the invention.

Figure 1:
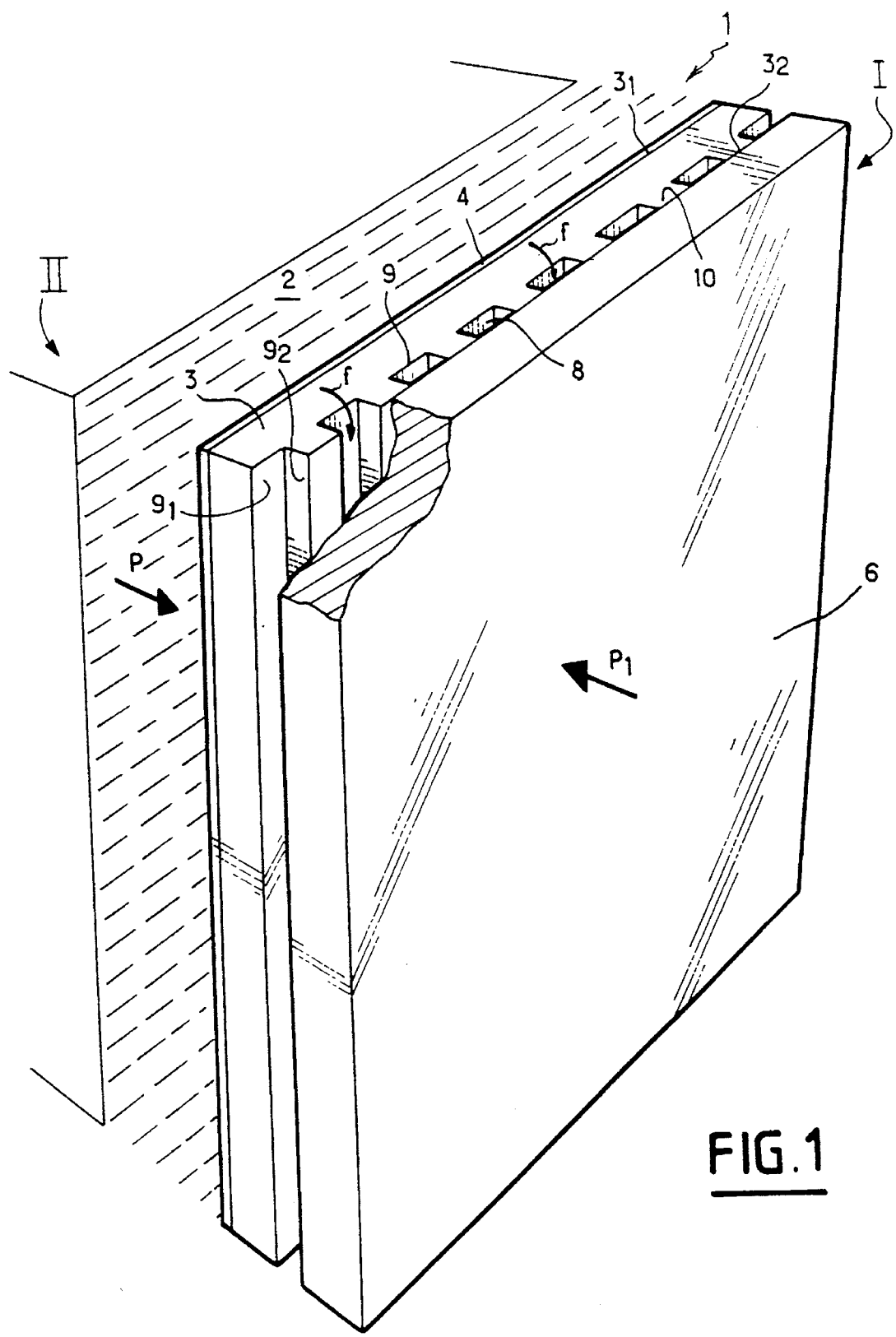
FIG. 1 is a view in perspective of a first embodiment of an inorganic membrane according to the invention.

BEST EMBODIMENT OF THE INVENTION:

FIG. 1 illustrates a first embodiment of an inorganic filtration unit 1 according to the invention, adapted to ensure the separation or filtration of molecules or particles contained in a liquid medium 2 of diverse type, which may or may not contain a solid phase. The filtration unit 1 is composed of a filter element I and an element II placed at a distance from and facing the element I so as to ensure that the liquid medium 2 circulates in the form of a sheet of liquid. The height h of this sheet of liquid, which is defined by spacers of any type known per se (not shown), is between 0.1 and 3 mm and preferably between 0.2 and 1.5 mm. The filter element I comprises a porous or permeable support 3 of rigid or non-deformable character, which is made of a material whose transfer resistance is adapted to the separation to be performed. The support 3 is made of inorganic materials such as metal oxides, carbon or metals. According to the invention, the equivalent mean diameter of the pores in the support 3 is between 1 and 50 micrometers and preferably between 1 and 10 micrometers. The term "equivalent mean diameter of pores" is defined according to the technique known as mercury porometry, which determines the value of this diameter as that which corresponds to half the total volume penetrated by mercury. Preferably, the thickness of the support 3 is greater than or equal to 0.5 millimeter and less than 6 millimeters.

In the Example illustrated, the porous support 3 takes the form of a plate or square comprising a principal plane face $3_1$, preferably smooth in character, which is covered with at least one separating layer 4 intended to be in contact with the liquid medium 2. The nature of the separating layer or layers 4 is chosen according to the separating or filtering capacity to be obtained, and forms an intimate bond with the support 3 so that the pressure P applied by the liquid medium 2 is transmitted to the porous support 3. This layer or these layers 4 can be deposited for example from suspensions containing at least one metal oxide and conventionally used in the production of inorganic filter elements. After drying, this layer or these layers are subjected to a sintering operation, which makes it possible to consolidate them and to bond them to one another and to the porous support 3.

Preferably, the materials used to deposit these separating layers are pure oxides, such as alumina, $Al_2O_3$, zirconium oxide, $ZrO_2$, titanium oxide, $TiO_2$, or silicon oxide, $SiO_2$, or mixtures of these pure oxides, such as $(Al_2O_3+TiO_2)$, $(Al_2O_3+SiO_2)$, $(TiO_2+SiO_2)$, $(ZrO_2+SiO_2)$ or $(ZrO_2+TiO_2)$.

These mixtures each define the association of one oxide with a less refractory oxide, making it possible to lower the sintering temperatures. The proportions of refractory oxide to less refractory oxide vary between 100 and 1. Depending on the initial particle size, the equivalent mean diameters of these layers are between 0.1 and 1.5 microns.

The filter elements produced above are used for microfiltration operations, but can also be used as substrates for deposits, classified as mesoporous, which make it possible to obtain much smaller equivalent mean diameters: 2 nm to 90 nm.

The materials used for these mesoporous deposits are pure oxides, such as $Al_2O_3$, $TiO_2$, $ZrO_2$ or $SiO_2$, or mixtures of these various oxides.

The filter element I also comprises a counter-thrust element 6 which exerts, on the porous support 3, an opposing pressure $P_1$ approximately equivalent to the pressure P applied to the separating layer 3. For this purpose, the element 6 is applied, by any appropriate means (not shown), to the principal face $3_2$ of the porous support 3, opposite the principal face $3_1$. The counterthrust element 6 enables the porous support 3 to work under compression, irrespective of its exchange area, so that it is possible to produce a porous support of low thickness which nevertheless has a good mechanical strength. By way of a non-limiting Example, it is possible to envisage producing a porous support 3 having a width and length both equal to 300 millimeters and a thickness equal to 3 millimeters. Preferably, the length/width ratio of the porous support 3 is between 1 and 10, the thickness of this support being between 0.5 and 6 mm.

The filtration unit according to the invention also comprises means such as a cavity 8 situated at a distance from the separating layer 4 and adapted for recovering the filtrate which has passed through the porous support 3 from the separating layer 4. The filtrate which passes through the thickness of the porous support 3 from the separating layer 4 comes out into the cavity 8, in the direction of the arrows f, and is then collected or recovered from the edge or the principal faces of the filtration unit by any appropriate means.

In one embodiment, the receiving cavity 8 consists of a network of channels 9 made in the principal face 3₂ of the support. According to one advantageous characteristic of the invention, each channel 9 has a flat bottom 9₁ from which sides 9₂ rise up in an approximately perpendicular direction. The channels 9 thus possess a rectangular cross-section, as illustrated more precisely in FIG. 2. Remaining between the channels 9 there are bearings 10 with which the counterthrust element 6 comes into contact. The bearings 10 are adapted to ensure the mechanical strength of the filter element when the porous support 3 is working under compression. In practice, the cross-section and number of the bearings are defined so that the deformation of the surface of the porous support, beyond the bearings 10, is less than the breaking deformation. The area occupied by these bearings, corresponding to their number multiplied by their cross-section, must be as small as possible within the breaking limit given above, so as to avoid too great a reduction in the exchange area.

It must be considered that the height of the bearings 10 has no influence on the loss of performance, but makes it possible to adapt the flow of filtrate without causing pressure losses which would oppose the transfer pressure P and $P_1$. The height of the bearings 10 can vary while the exchange area remains constant. The height of the bearings 10 is defined so that the pressure loss of the flow of filtrate is less than 0.1 bar.

In a first embodiment, the channels 9 are made so as to be approximately parallel to one another along the length of the porous support.

The profile of the channels 9 has the advantage of reducing the path of the filtrate across the porous support 3, so as to minimize the pressure loss and hence the mean hydraulic resistance of the filter element. Furthermore, using a plane surface 3₁ to form the filtering area of the element I makes it possible to obtain a unit possessing a high filtration rate.

Figure 3:
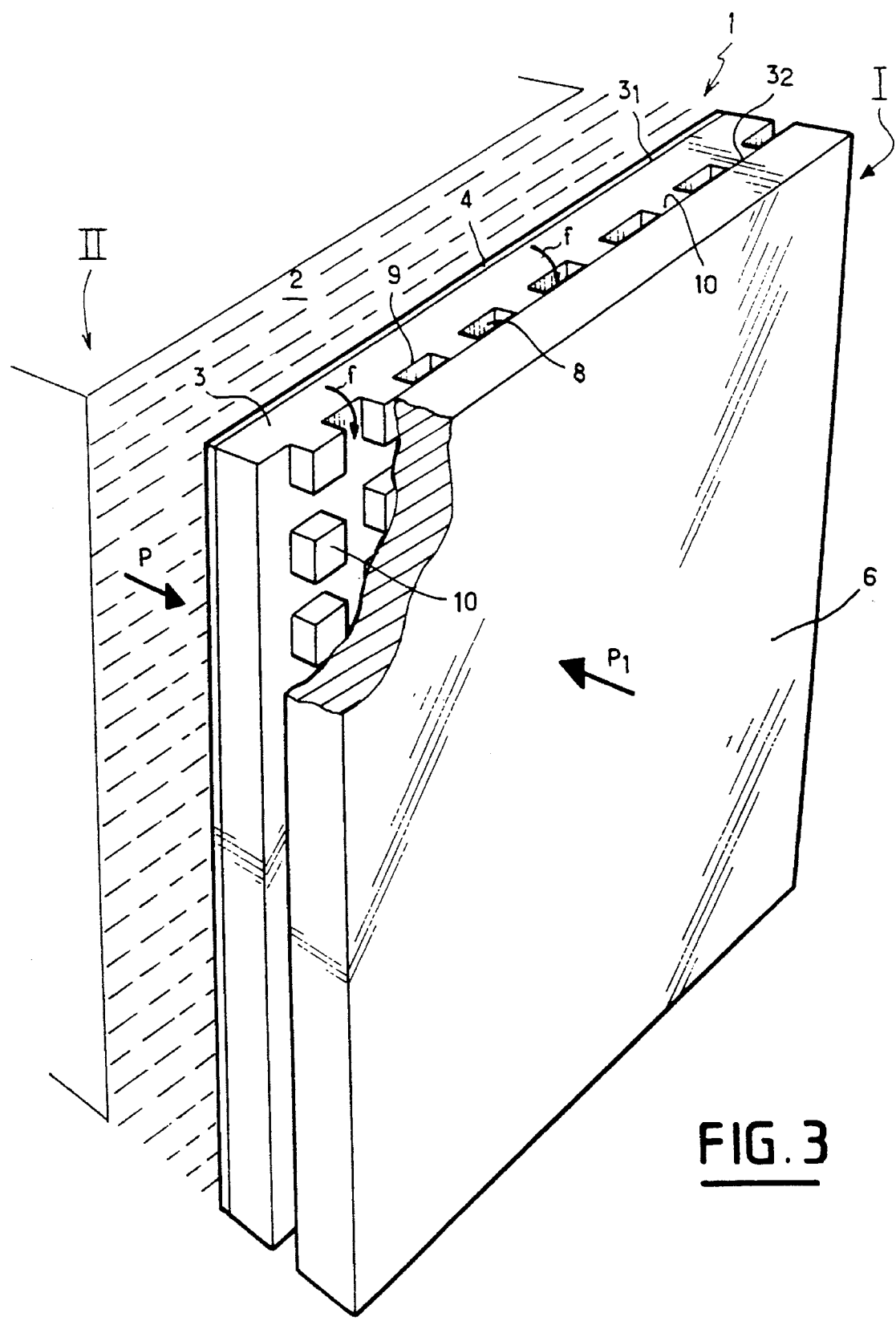
FIG. 3 is a view in perspective showing an advantageous characteristic of the invention.

In a second embodiment, illustrated in FIG. 3, provision can be made to produce the filtrate recovery cavity 8 by means of channels 11 communicating with one another to form a criss-cross filtrate recovery network. Remaining between the channels 11 there are localized bearings 10, such as studs, enabling the filter element to function appropriately. It should be noted that the cross-section of the bearings 10 can be of any shape.

Figure 2:
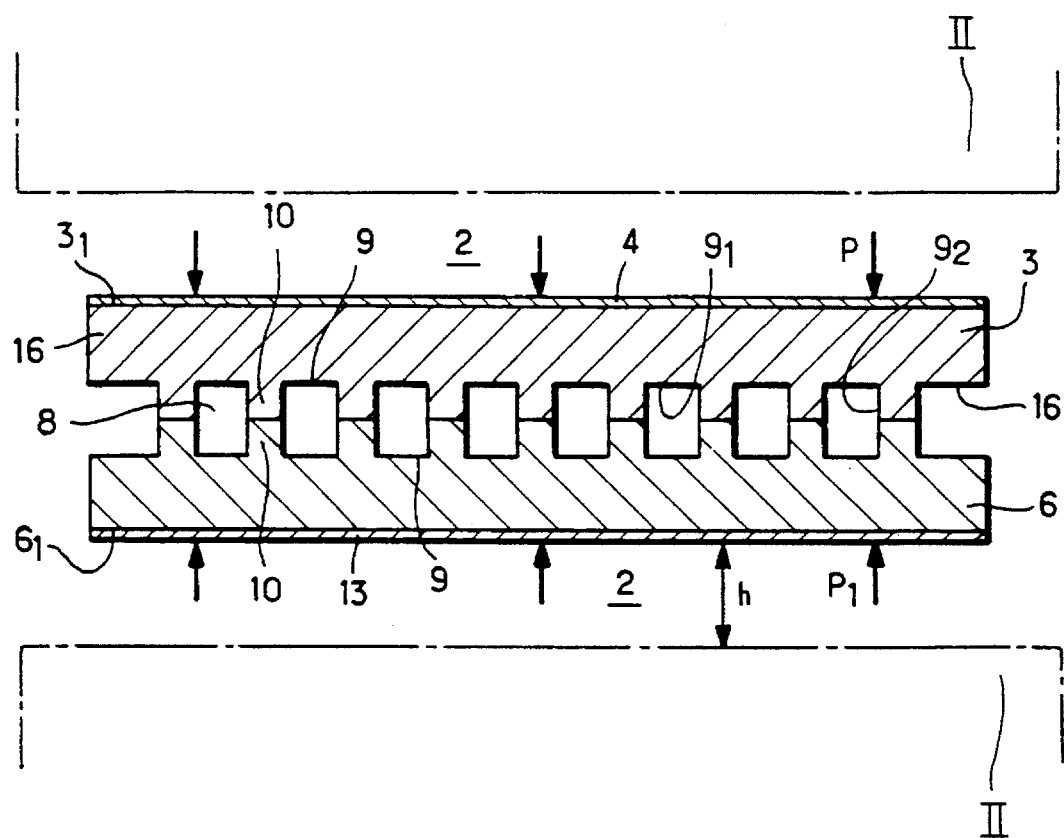
FIG. 2 is a view in section showing the construction of a double-filtration membrane produced from the embodiment of FIG. 1.

In one particularly advantageous embodiment, illustrated in FIG. 2, the counterthrust element 6 consists of a complementary porous support having a principal external plane face 6₁ provided with at least one separating layer 13, which is intended to be in contact with the liquid medium 2 to be filtered. The filter element produced in this way, which is commonly called a packet, therefore comprises two opposite plane separating layers 4, 13 extending on either side of the porous supports 3 and 6. The separating layer 13 is placed in communication with an element II, ensuring that a liquid medium to be treated circulates in the form of a sheet. The packet thus consisting of the porous supports 3 and 6 works under compression, because an approximately equivalent working pressure is exerted on each of the faces 3₁, 6₁ in contact with the liquid medium 2. The filtrate passes through the porous supports 3 and 6 from the separating layers 4 and 13 and is then recovered by the cavity 8. Preferably, but not exclusively, the complementary porous support 6 is identical to the porous support 3 and is fitted symmetrically to the support 3, as illustrated in FIG. 2. The bearings 10 of the two supports are in mutual contact, while the channels 9 running in one support each face a channel running in the other support, so as to form a cavity 8 with twice the capacity of that illustrated in FIG. 1. The contact between the respective bearings 10 can be provided by a weld produced by depositing a layer of glass or clay on these bearings and then subjected to a heat treatment. It is of course possible to envisage producing the channels 9 in a criss-cross fashion so that the bearings 10 are formed by studs.

The packet produced in this way has the advantage of comprising a double face suitable for the deposition of separating layers 4, 13, and of being made from a single porous support 3 or 6 of plane type, which can easily be manufactured continuously. Moreover, the configuration of this packet ensures that it has a good mechanical strength insofar as the supports 3 and 6 work under compression.

It should be noted that the complementary porous support 6 can form an integral part of the porous support 3 so as to produce the filter element I in an integrated form. In this embodiment, the filter element may or may not incorporate criss-cross threads, which are intended to be removed during the sintering heat treatment to produce the cavity 8.

As shown in the Figures, each support 3 or 6 is provided with joining means, for example of the interlocking type, making it possible to form a modular packet. For this purpose, provision can be made for a peripheral tongue 16 along the edges supports 3 or 6. These joining means 16 make it possible to produce filtration units of chosen dimensions by assembling the desired number of elements I according to the invention side by side.

POSSIBLE INDUSTRIAL APPLICATION

A packet comprising a porous support and a complementary porous support, which are covered with a layer having an equivalent mean pore diameter of 5 nm, produced according to one of the plane configurations, was placed in the two restraints of a laboratory apparatus normally intended to function with plane organic membranes. In the case of organic membranes, the latter are arranged on a plate whose role is to provide the working resistance. When the packet according to the invention is used, this plate is omitted so that a sheet of liquid appears on either side of the layers 4, 13. The leaktightness between these layers and the elements II is provided in conventional manner by means of seals with a thickness of 0.5 mm.

The apparatus is then connected to a circulating pump and the circuit is filled with an aqueous solution of DEXTRAN T10, which corresponds to a polysaccharide of molecular weight 10,000 Daltons. The concentration of the DEXTRAN T10 is 1 g/l. The circulation rate is adjusted to 200 l/h per sheet of liquid and the working pressure is gradually raised to 4 b.

The filtrate which has flowed through the cavities is collected for quantitative analysis by refractometry. Its content of DEXTRAN T10 is 0.05 g/l. This value corresponds to a retention rate of 95%.

This Example shows that the subject of the invention makes it possible to withstand the working pressure and to obtain a good separating efficiency.

Thus, as shown more precisely in FIG. 2, the height h of the liquid sheet of the medium to be treated, 2, is defined between the separating layers 4 and 13 of the faces 3₁ and 6₁ and the elements II ensuring that the fluid circulates in the form of a sheet of liquid. According to the invention, this height h is between 0.1 and 3 mm and preferably between 0.2 and 1.5 mm. It should be noted that although the height h of the section of the sheet of liquid is very small compared with the other dimension, the corresponding hydraulic diameter of this sheet of liquid is of the order of twice the height h.

According to one advantageous characteristic of the invention, the element or elements II are formed by a filter element I as defined above.

The invention is not limited to the Examples described and shown, it being possible for various modifications to be applied thereto without exceeding the framework of the invention.

What is claimed is:

1. An inorganic unit for the filtration of a liquid medium in order to recover a filtrate, the unit comprising:
    at least one filter element (I) composed of:
        an inorganic rigid porous support (3) having first and second spaced apart planar faces ($3_1$ and $3_2$), the first face being covered with at least one separating layer (4) arranged to be in contact with the liquid medium, which exerts a given pressure (P) on said separating layer,
        a counterthrust element (6) arranged to exert, on the support (3), an opposing pressure ($P_1$) approximately equivalent to that (P) applied to the separating layer (4),
        and at least one cavity (8) formed in the second face of the porous support at a position spaced from the separating layer (4), said cavity being arranged to recover the filtrate which has passed through the porous support from the separating layer,
    and at least one element (II) for the circulation of the liquid medium (2), wherein:
        the separating layer is bonded to the porous support by sintering,
        and the at least one element (II) is spaced from the at least one filter element (I) by means for causing, with the planar face ($3_1$) of the filter element, the liquid medium to circulate as a sheet of liquid with a height (h) of between 0.1 and 3 mm.

2. A filtration unit according to claim 1 wherein the counterthrust element (6) consists of a complementary inorganic porous support having a plane external face ($6_1$) provided with at least one separating layer (13) intended to be in contact with the liquid medium to be filtered, which exerts the opposing pressure ($P_1$) on said separating layer.

3. A filtration unit according to claim 2 wherein the at least one cavity consists of a network of channels that form a filtrate recovery network delimiting bearings between the channels, and wherein the complementary porous support (6) is identical to the porous support (3) and is symmetrically fitted to the porous support (3) so that the bearings (10) of the two supports am in mutual contact.

4. A filtration unit according to claim 3 wherein the porous supports (3) are welded to one another at their respective bearings (10).

5. A filtration unit according to claim 3 wherein the height of the bearings is determined so as to ensure that the filtrate flows with a pressure loss of less than 0.1 bar.

6. A filtration unit according to claim 2 wherein the complementary porous support (6) forms an integral part of the porous support (3).

7. A filtration unit according to claim 6 wherein the porous support (3 and 6) incorporates a mesh, the removal of which makes it possible to form the filtrate recovery cavity (8).

8. A filtration unit according to claim 1 wherein the pores in the porous support (3) have a mean diameter of between 1 and 50 micrometers.

9. A filtration unit according to claim 8 wherein the pores in the porous support (3) have a mean diameter of between 5 and 10 micrometers.

10. A filtration unit according to claim 1 wherein the porous support (3) is provided with one or more separating layers (4, 13) whose pores have equivalent diameters of between 0.1 and 1.5 micrometers.

11. A filtration unit according to claim 10 wherein the separating layer or layers (4, 13) are covered with a complementary separating layer having equivalent mean diameters of between 2 and 90 nm.

12. A filtration unit according to claim 1 wherein the separating layers are produced by the deposition of pure oxides.

13. A filtration unit according to claim 12 wherein the pure oxides are selected from the group consisting of $Al_2O_3$, $TiO_2$, $ZrO_2$ and $SiO_2$.

14. A filtration unit according to claim 1 wherein the cavity or cavities (8) have a flat bottom ($9_1$) from which sides ($9_2$) rise up in an approximately perpendicular direction, the cavities delimiting between one another bearings (10) for reacting to the working of the porous support under compression.

15. A filtration unit according to claim 14 wherein the cavities (8) communicate with one another to form a criss-cross filtrate recovery network delimiting bearings (10).

16. A filtration unit according to claim 1 wherein the at least one cavity consists of a network of channels that form a filtrate recovery network delimiting bearings between the channels and wherein the height of the bearings for the porous support and a complementary porous support of the counterthrust element is determined so as to ensure that the filtrate flows with a pressure loss of less than 0.1 bar.

17. A filtration unit according to claim 1 wherein the porous supports (3, 6) each have a length/width ratio of between 1 and 10, the thickness being between 0.5 and 6 mm.

18. An inorganic filtration unit according to claim 1 wherein the element (II) for the circulation of the liquid consists of an inorganic filter element (I) according to the invention.

19. A filtration unit according to claim 1 wherein the element (II) is further arranged to cause, with the planar face ($3_1$) of the filter element, the liquid medium to circulate as a sheet of liquid having a height (h) of between 0.2 and 2.5 mm.

20. A filtration unit according to claim 1 wherein the separating layers are produced by the deposition of mixture of pure oxides selected from the group consisting of ($Al_2O_3$+$SiO_2$), ($Al_2O_3$+$SiO_2$), ($TiO_2$+$SiO_2$), and ($ZrO_2$+$TiO_2$).

* * * * *